United States Patent [19]

Ito

[11] Patent Number: 5,518,748
[45] Date of Patent: May 21, 1996

[54] EDIBLE CONTAINERS AND METHODS OF MAKING THE SAME

[76] Inventor: Sadaharu Ito, 30-5, Saginomiya 1-chome, Tokyo, Japan

[21] Appl. No.: 327,633

[22] Filed: Oct. 24, 1994

[51] Int. Cl.⁶ ..................................... A21D 13/08
[52] U.S. Cl. .................. 426/499; 426/138; 426/139; 426/143; 426/391; 426/502; 426/504; 426/512; 426/556; 493/140; 493/155; 493/157
[58] Field of Search ..................... 426/138, 139, 426/143, 549, 391, 439, 504, 502, 503, 556, 512, 94, 95, 499; 229/401–405; 493/136, 140, 152, 155, 157, 901, 902

[56] References Cited

U.S. PATENT DOCUMENTS

| | | | |
|---|---|---|---|
| 759,029 | 5/1904 | Shea | 229/402 |
| 1,156,391 | 10/1915 | Conard | 493/136 X |
| 1,443,280 | 1/1933 | Schnackenberg | 493/152 X |
| 1,910,178 | 5/1933 | Novick | 229/402 |
| 1,931,213 | 10/1933 | Wheeler | 229/402 X |
| 2,097,893 | 11/1937 | Reich | 229/402 X |
| 2,435,906 | 2/1948 | Shapiro | 426/139 |
| 3,086,484 | 4/1963 | Ibex | 493/155 X |
| 3,410,691 | 11/1968 | Stanley | 426/94 |
| 4,927,655 | 5/1990 | Ito | 426/138 X |
| 4,927,656 | 5/1990 | Ito | 426/138 X |
| 5,284,672 | 2/1994 | Ito | 426/138 X |
| 5,298,273 | 3/1994 | Ito | 426/139 X |

FOREIGN PATENT DOCUMENTS

| | | |
|---|---|---|
| 38-6554 | 5/1963 | Japan . |
| 50-82277 | 7/1975 | Japan . |
| 59-109127 | 6/1984 | Japan . |
| 61-149036 | 7/1986 | Japan . |
| 6-23272 | 6/1994 | Japan . |

*Primary Examiner*—Donald E. Czaja
*Assistant Examiner*—Milton Cano
*Attorney, Agent, or Firm*—Nixon & Vanderhye

[57] ABSTRACT

An edible container includes a truncated conically shaped side wall panel made of an edible dough having a pair of opposed side edges which are overlapped with one another, and arcuate upper and lower edges. A plurality of parabolic pieces are integral with the side wall panel and positioned in side-by-side relationship about its lower edge. The parabolic piece are inwardly folded relative to the lower edge thereof such that adjacent ones of the parabolic pieces at least partially overlap and adhere to one another. These at least partially overlapped and adhered adjacent parabolic pieces form a substantially flat bottom wall of the edible container. To form the container, a flat sheet of edible dough is wrapped around a forming mandrel so that the side wall panel is formed into a generally conical shape. Simultaneously with such wrapping of the flat sheet, the parabolic pieces are sequentially folded inwardly relative to a lower region of the side wall panel such that adjacent ones of the parabolic pieces will be caused to at least partially overlap and adhere to one another.

12 Claims, 10 Drawing Sheets

EDIBLE CONTAINERS AND METHODS OF MAKING THE SAME

BACKGROUND OF THE INVENTION

1. Field of the Invention

The present invention relates to a bottomed, conical edible container, its production process and its production apparatus for containing frozen confections such as soft ice cream and ice cream as well as various other types of food products, said edible container having a small apparent specific gravity, being lightweight and porous, and preferably having a crispy texture when eaten.

2. Description of the Prior Art

The edible base materials for edible containers that are sold in the form of containing frozen confections such as soft ice cream or ice cream served in stores are typically kneaded after blending a large amount of water with raw materials such as wheat flour by the respective manufacturer to form a so-called dough. This dough is then baked to form a sheet on a high-temperature heating plate, and then formed into a conical shape. This is then packaged as a waffle cone and distributed to ice cream and soft ice cream stores. Refer to U.S. Pat. No. 5,284,672 filed by the applicant of the present invention for an example of this prior art.

Although this type of waffle cone is the main form of edible containers conventionally used in the sales of frozen confections, since these waffle cones are formed to have a pointed bottom, they have the disadvantage of not being able to be set down as is.

In addition, in the case of forming a flat bottom for this waffle cone to enable it to be set down, after wrapping the peripheral wall in the shape of a cup, the bottom end of the peripheral wall is bent to form the bottom. As a result, the so-called dough dries rapidly thereby causing a deficiency of flexibility. Consequently, the portion that serves as the bottom ends up braking easily when bent thus resulting in the disadvantage of being unable to form the bottom surface.

Moreover, even if bending of the bottom surface is made possible by heating the dough before wrapping to return its softness to enable bending, not only are a heating device and time for returning softness required, a process is also necessary for bending the bottom surface and sealing the bent bottom surface. This resulted in the disadvantage of expenses accompanying these processes causing increases in costs.

On the other hand, when a flat sheet of dough to serve as an edible container in the form of a flat sheet is formed with a press mold that forms the dough into the shape of a cup, molding defects occur frequently, including cracks forming in the flat sheet and wrinkles forming in those portions that are not extended, thus resulting in disadvantages such as a lack of profitability.

SUMMARY OF THE INVENTION

The object of the present invention is to provide a cup-shaped edible container, its production process and its production apparatus that, together with solving the problem of being unable to set down a conventional waffle cone, also solves problems in terms of production of waffle cups by forming the peripheral wall and bottom simultaneously.

The means of the present invention relate to a waffle cup-shaped edible container that is able to achieve the object described above, being characterized by kneading wheat flour, sugar, an oil or fat and other raw materials with water to form a dough; and, heating and drying a flat sheet of this dough to an extent that preserves flexibility; wherein, said flat sheet of dough has one side in the shape of an arc in the same manner as the shape that results from opening up a conical shape from which the tip has been cut, the side that opposes the above-mentioned arc-shaped side is cut into a shape that is separated into a plurality of parabolic pieces, said parabolic pieces are sequentially folded from their base ends followed by overlapping and adhesion, and two opposing sides between the arc-shaped side and parabolic pieces are overlapped and adhered to form a cup in the shape of an inverted cone with a bottom.

The means are characterized by forming the above-mentioned dough by stirring and mixing 100 parts wheat flour, 40 parts sugar, 10 parts of an oil or fat (coconut oil), 0.2 parts salt, 100 parts water, and small amounts of egg, milk and colorant. Furthermore, refer to U.S. Pat. Nos. 4,927,655 and 4,927,656 filed by the applicant of the present invention regarding the ingredients of the dough.

The production process is characterized by being a production process for the edible container of the present invention equipped with: a process wherein materials such as wheat flour, sugar and a fat or oil are kneaded with water to form a dough that is poured and spread onto a heating plate; a heating and drying process wherein this dough is sandwiched with another heating plate to alphatize the flour starch in the dough, and then dried to an extent that maintains flexibility by evaporating the moisture in said dough; a cutting process wherein a flat sheet is cut into a shape wherein one side is in the shape of an arc in the same manner as the shape that results from opening up a conical shape from which the tip has been cut, and the side opposing this arc-shaped side is cut into a shape separated into a plurality of parabolic pieces; a forming process wherein this cut flat sheet is wrapped into the shape of a cone without a tip, and the above-mentioned parabolic pieces are sequentially folded from their base ends followed by overlapping and adhesion; and, a process wherein said flat sheet of dough on which this forming process has been completed is cooled and solidified.

The production process is a means of supplying a flat sheet of dough in the form of a flat sheet before forming into an edible container to retail stores, and then forming said edible container immediately before serving to customers at said retail stores; wherein said forming is performed by a process wherein raw materials such as wheat flour, sugar and a fat or oil are kneaded with water to form a dough and said dough is poured and spread onto a heating plate; a heating and drying process wherein this dough is sandwiched with another heating plate to alphatize the flour starch in the dough, and then dried to an extent that maintains flexibility by evaporating the moisture in said dough; a moisturizing process wherein this heated and dried flat sheet is moisturized to increase flexibility for prevention of breakage during transport and so forth; a process wherein moisture-resistant peelable sheets are inserted between the flat sheets of dough that have gone through the above-mentioned moisturization process, and said moisture-resistant peelable sheets are removed immediately before the above-mentioned forming process; a reheating and drying process wherein the flat sheets of dough from which the above-mentioned moisture-resistant peelable sheets have been removed are heated and dried to an extent that maintains flexibility; and, the above-mentioned forming process after going through the above-mentioned cutting process.

The production apparatus is an apparatus for producing the edible container of the present invention, and is characterized by being equipped with a guide plate that guides the above-mentioned arc-shaped side of a flat sheet of dough that has been cut in a cutting process wherein said flat sheet is cut into a shape wherein one side is in the shape of an arc in the same manner as the shape that results from opening up a conical shape from which the tip has been cut, and the side opposing this arc-shaped side is cut into a shape separated into a plurality of parabolic pieces, following heating and drying of said flat sheet of dough formed by kneading raw materials such as wheat flour, sugar and an oil or fat with water; a bending guide that sequentially lifts up and bends the ends of the parabolic pieces and feeds them to a wrapping guide to be described henceforth; a wrapping guide that wraps the flat sheet of dough that has been guided by said guide plate and bending guide, and overlaps said parabolic pieces and forms them into the shape of a conical cup with a bottom; and a sealing tool that seals the overlapped portions of both left and right sides with the overlapped parabolic pieces.

The material from which the guide plate, bending guide and wrapping guide of the production apparatus according to invention may be formed is preferably selected from aluminum, stainless steel or plastic.

The material referred to as the dough of the edible container of the present invention is a material of flour and other edible materials. After kneading this dough and baking to form a flat sheet, by sealing both the left and right ends of an arc-shaped end in the shape of a cone that has been opened up without a tip, the peripheral walls are formed in the shape of a cup, while the opening of the cup is formed by the arc-shaped side. At the same time, since the side opposing this arc-shaped side is separated into parabolic pieces, these parabolic pieces are sequentially bent from their base ends. By then overlapping these parabolic pieces and sealing them, the above-mentioned flat sheet is formed into the shape of a cup that has a bottom.

In the production process, the kneaded materials of the above-mentioned edible container are poured and spread onto a heating plate at 170°–220° C. By then sandwiching between another heating plate, a sheet is formed that has been heated and dried to a moisture content of roughly 34%. This is then cut to the above-mentioned shape in a cutting process, wrapped so that the arc-shaped side is rolled up, and both the right and left sides are overlapped and sealed. Together with this forming the peripheral walls in the shape of a cup, if the parabolic pieces are sequentially folded from their base ends and sealed so that said parabolic pieces overlap, the bottom of the cup is formed. This is then cooled and solidified to form an edible container in the shape of a cup.

In the production process after pouring and spreading the kneaded materials of the edible container described above onto & heating plate at 170°–220° C., and forming a sheet that has been heated and dried to a moisture content of roughly 3% by sandwiching between another heating plate, water is sprayed onto the resulting sheet to increase the moisture content to roughly 15% and make it difficult to crack.

Moisture-resistant peelable sheets are then inserted between the flat sheets to serve as edible containers that have been moisturized in the moisturization process. Together with preventing each flat sheet of dough from sticking together, several sheets are placed in a sealed, pack that makes them difficult to crack, and then shipped to retail stores and so forth. At the retail stores and so forth, the moisture-resistant peelable sheets are peeled off at the time of sales of frozen confections. After cutting in the above-mentioned cutting process, since the flat sheets can then be formed into the shape of a cup by a forming process, the shipment and storage volume can be reduced, moisture absorption and deformation can be prevented, and breakage during transport and storage can also be prevented. Furthermore, it goes without saying that the cutting process may be performed before sealed packaging.

In the production apparatus the arc-shaped side of a flat sheet of dough cut in a cutting process is guided by a guide plate and wrapped by a wrapping guide. At this time, parabolic pieces are lifted up and bent from their base ends by a bending guide. Together with the peripheral walls being formed into the shape of a cup, the parabolic pieces are overlapped and sealed to form a cup shape in a single step.

In the production apparatuses, as a result of forming the guide plate, bending guide and wrapping guide from aluminum, stainless steel or plastic, heating and maintaining of temperature can be performed easily, and the flat sheet that serves as the edible container can be formed into the shape of a cup smoothly without adhesion or sticking.

DESCRIPTION OF THE PREFERRED EMBODIMENTS

The following provides an explanation of the preferred embodiments of the edible container of the present invention, its production process and its production apparatus with reference to the attached drawings.

In this embodiment, a dough is formed by adequately stirring together the following ingredients:

| | |
|---|---|
| Wheat flour | 100 |
| Sugar | 40 |
| Oil or fat (palm oil) | 10 |
| Salt | 0.2 |
| Water | 100 |
| (including small amounts of egg, milk, coloring and fragrance). | |

Although this dough is poured and spread onto a heating plate not shown engraved with a grid pattern having vertical and horizontal grids at 10 mm intervals, the surface of the heating plate is heated in advance to 180°–200° C. A heating plate heated to 170°–200° C. is then placed on top of the dough that has been poured and spread onto the above heating plate, after which the poured and spread dough is sandwiched between both heating plates. By then retaining and heating for a fixed period of time, for example 60 seconds, the dough becomes brown. After baking so that the residual moisture content becomes roughly 3%, the heating plates are opened, and the formed dough is removed with a scraper.

(a) The conditions for pouring and spreading the dough and heating and lowering the heating plates are as follows:
  (1) Amount of dough poured for one use: Approx. 25 cc
  (2) Temperature of heating plates (1 set, upper and lower plates): 180°–200° C.
  (3) Since the gap between the heating plates determines the thickness of the dough that is poured and spread, this gap should be roughly the thickness of of the baked material of the baked finished product, namely 2.5 mm.

(b) Baking temperature and time:
  (1) Baking temperature: 180° C. (surface of baking plate)–200° C.
  (2) Baking time: 90 seconds at 180° C., 60 seconds at 200° C.

(c) Baked state and residual moisture content:
  (1) When baked for 90 seconds at 170° C.: Somewhat yellowish-brown color, somewhat hard, residual moisture content of 4.0%
  (2) When baked for 60 seconds at 200° C.: Brown color, hard, residual moisture content: 2.35%

In any case, a flat sheet of heated and dried dough is obtained that retains flexibility and has grids formed at an interval of 10 mm and height of roughly 1.5 mm in its top and bottom surfaces.

Figure 5:
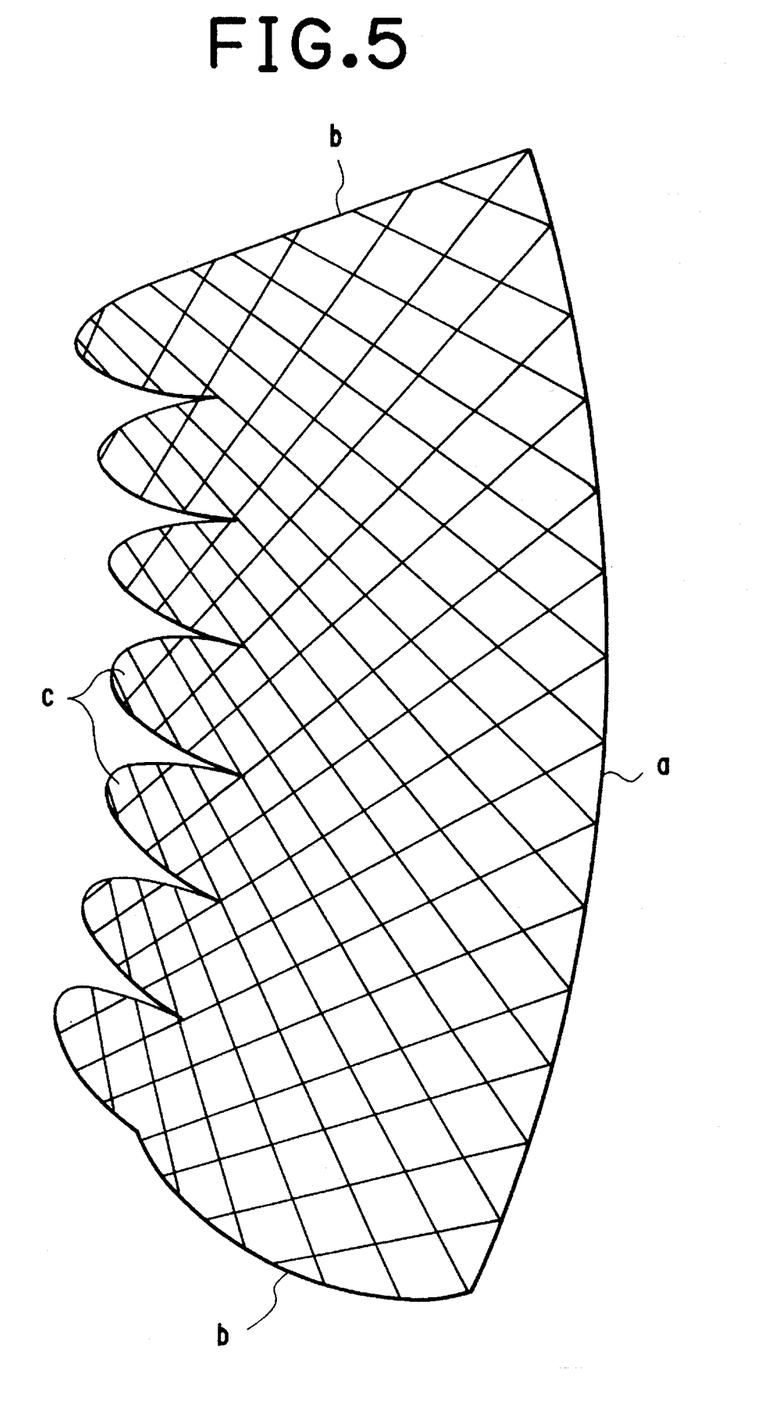
FIG. 5 is an overhead view of a flat sheet of stamped dough of the present invention.

This flat sheet is then stamped to the flat shape shown in FIG. 5 with a press.

In this flat shape, one side is arc-shaped side a like that which results when a cone without a tip is opened up, both sides b to the left and right of side a cross at a point extended to the opposite side of arc-shaped side a, and the side opposing arc-shaped side a is separated into a plurality of parabolic pieces c.

In addition, the adhered surface area can be increased by enlarging one side of both left and right sides b.

Furthermore, in the case of forming into a cup at a retail store engaged in the sales of frozen confections, after moisturizing the flat sheets to a moisture content of 10–15% to prevent cracking in a moisturization process in which the flat sheets are sprayed from above with water without forming the flat sheets during shipping, moisture-resistant peelable sheets are inserted between each flat sheet, the flat sheets are piled on top of each other and sealed in a package. Together with reducing the volume of shipping inventory, flat sheets can be shipped in a state that prevents moisture absorption, deformation and breakage in the case of shipping in the shape of cups.

After heating the flat sheets immediately before supplying cup containers at retail stores to restore flexibility, the flat sheets are stamped to the flat shape shown in FIG. 5.

Figure 6:
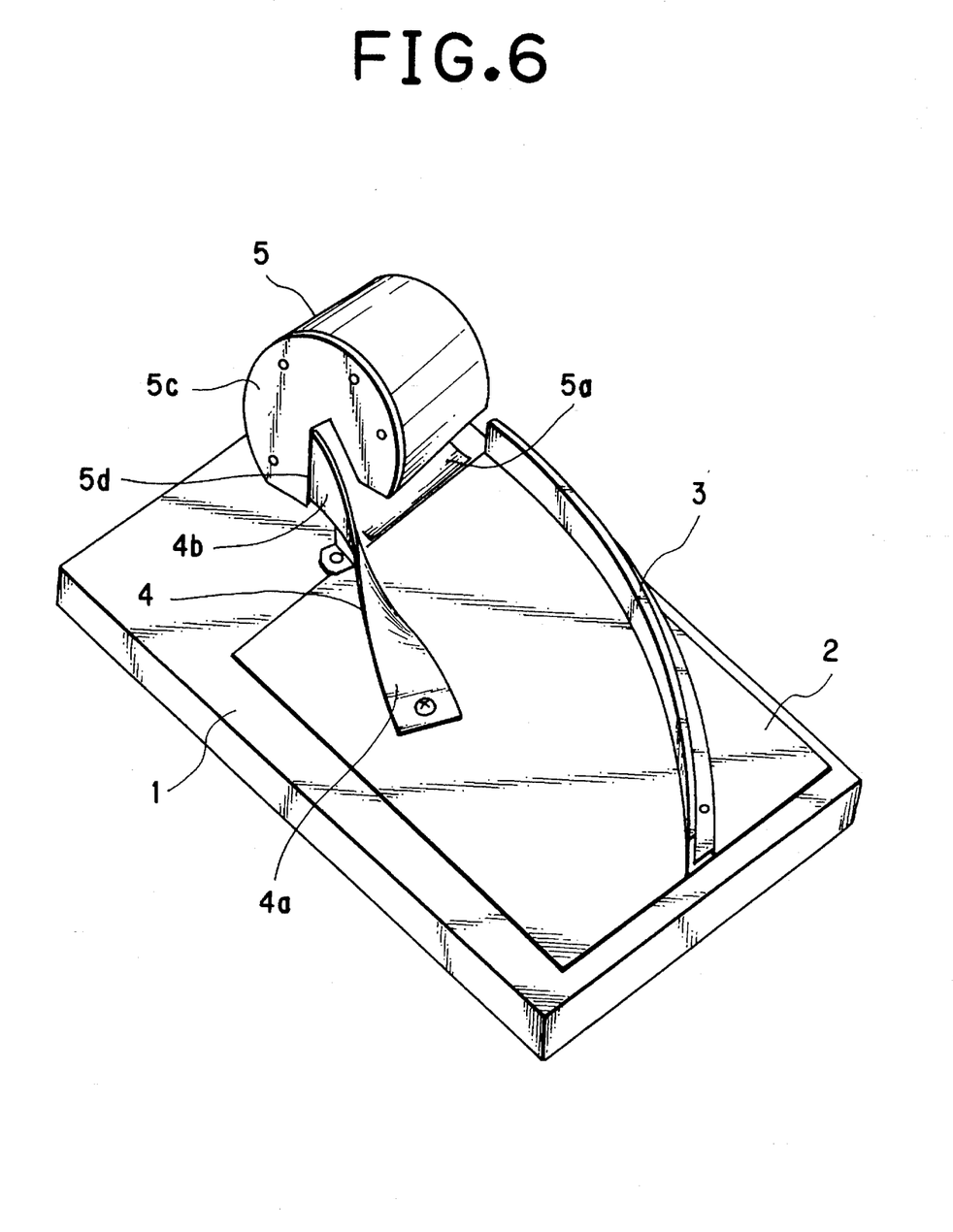
FIG. 6 is a perspective view of the production apparatus of the present invention.
Figure 7:
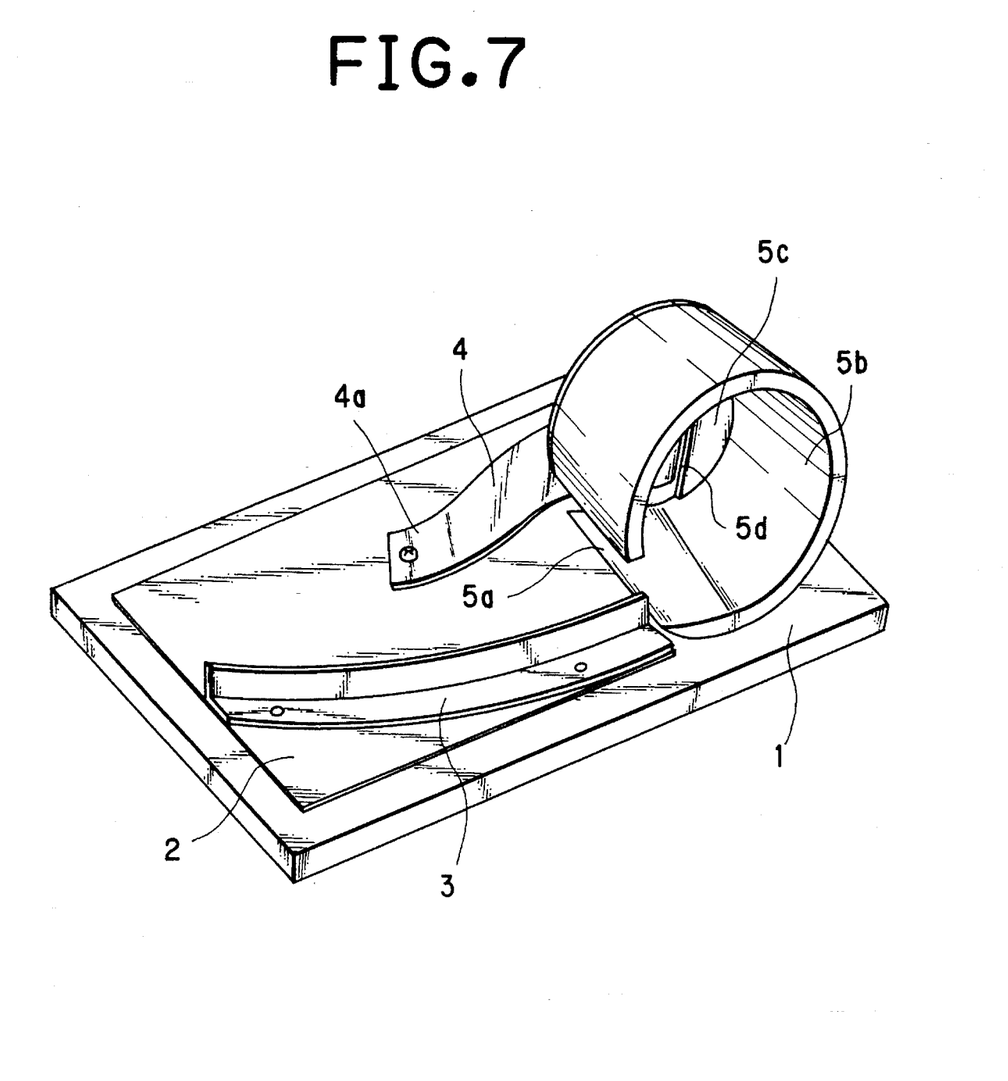
FIG. 7 is a perspective view of the above from the opposite side.
Figure 8:
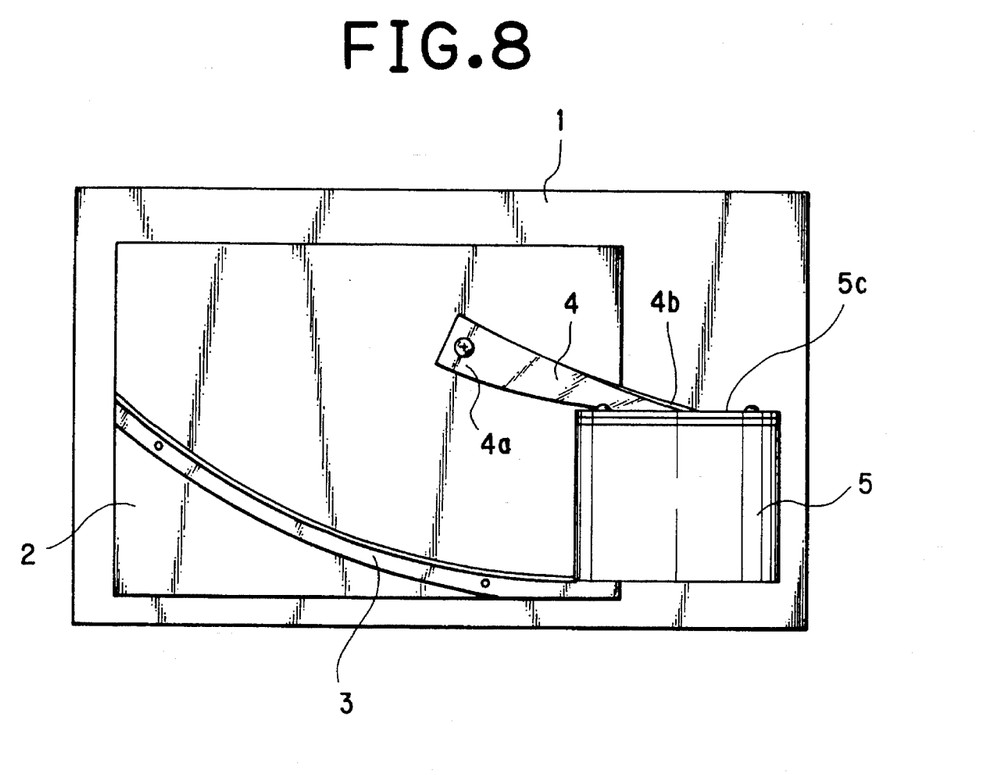
FIG. 8 is an overhead view of the above.
Figure 9:
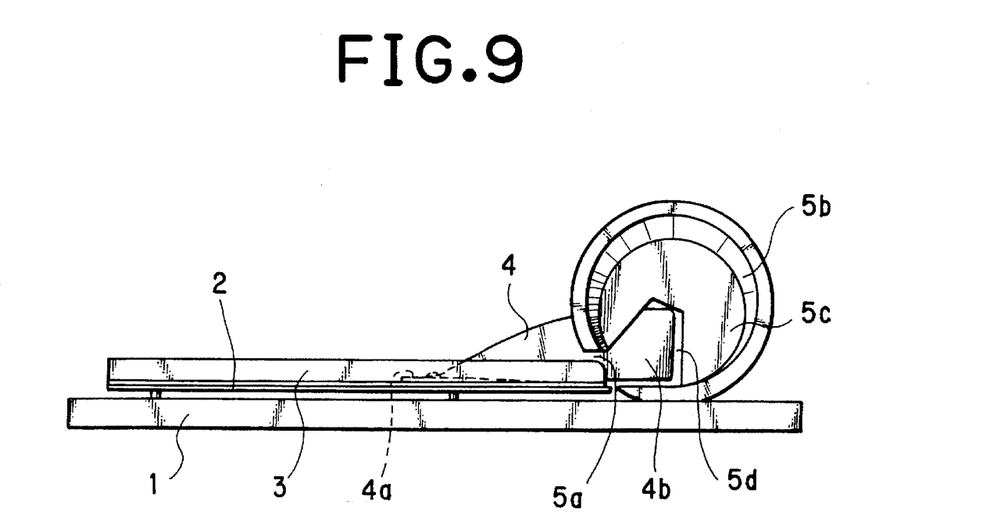
FIG. 9 is a front view of the above.
Figure 10:
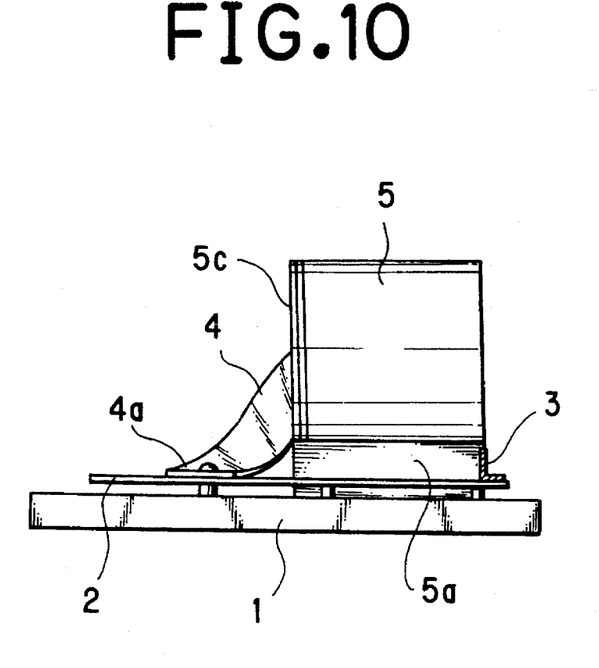
FIG. 10 is a side view of the above.
Figure 11:
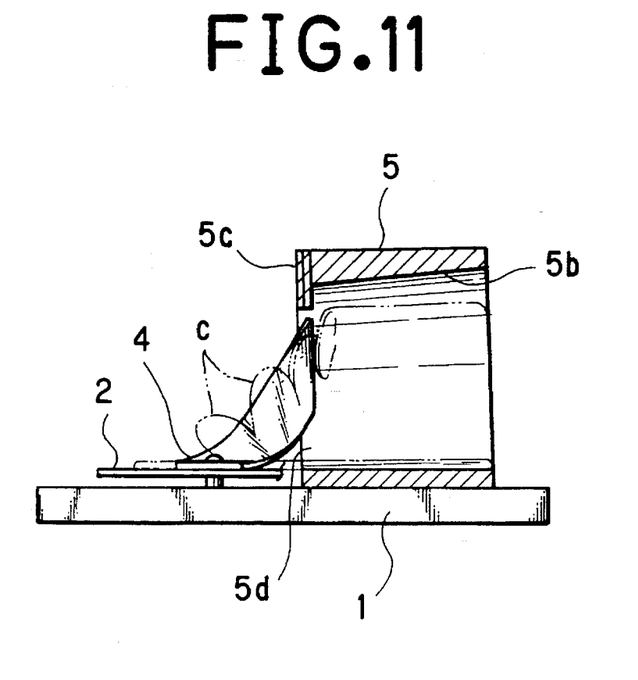
FIG. 11 is a cross-sectional view of the flat sheet of dough being wrapped in the above apparatus.
Figure 12:
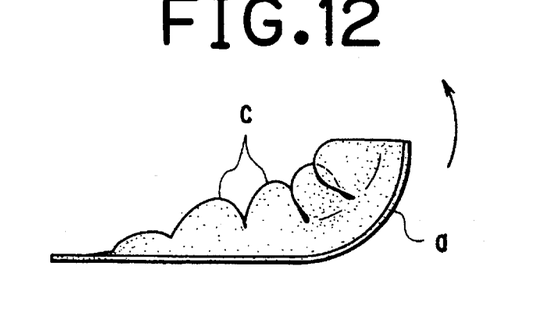
FIG. 12 is a front view indicating the state of partial wrapping of only the flat sheet of dough in the above apparatus.
Figure 13:
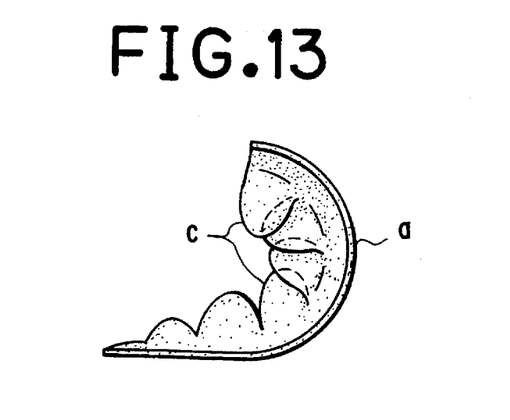
FIG. 13 is a front view indicating a more advanced state of partial wrapping of the above.
Figure 14:
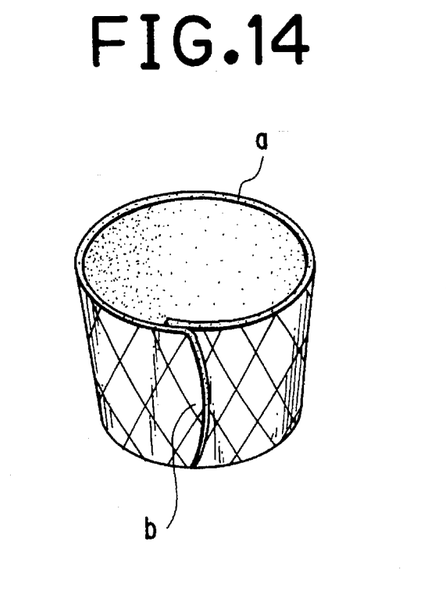
FIG. 14 is a perspective view from above the cup-shaped edible container according to the present invention.
Figure 15:
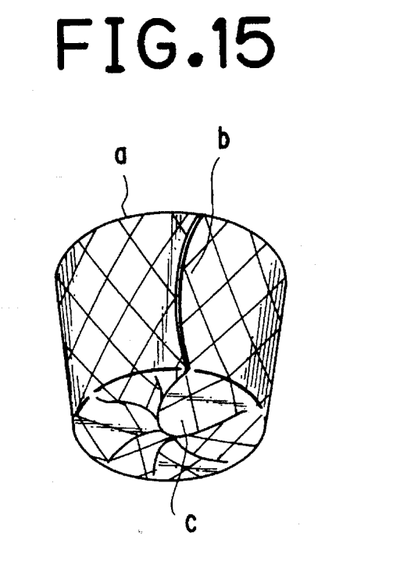
FIG. 15 is a perspective view from below of the same.

In the case of forming into the shape of cups at a frozen confection retail store or at a factory where the cutting process is performed, a forming apparatus described below is installed at that retail store or factory. This forming apparatus is shown in the perspective views of FIGS. 6 and 7, overhead view of FIG. 8, front view of FIG. 9, and side view of FIG. 10.

As shown in FIGS. 6 through 10, this forming apparatus is provided with guide plate 3, which rises in the shape of an arc that is the same as arc-shaped side a of the flat sheet stamped to the above-mentioned shape, on heating stand 2 mounted on work table 1, and bending guide 4, which is curved so that lead in side 4a is horizontal and lead out side 4b is vertical, at a location that corresponds to the base ends of parabolic pieces c in the case the above-mentioned arc-shaped side a is aligned with said guide plate 3.

Furthermore, a heating mechanism is not necessarily a requirement for this heating stand 2, but is only required to have a minimal warming function so that the material does not cool and solidify.

The terminal end of the above-mentioned guide plate 3 coincides with the end surface of heating stand 2. Together with opening 5a being provided at this location, inside surface 5b is in the shape of a cone. Wrapping guide 5, also having bottom plate 5c, is mounted on work table 1, and lead out side 4b of bending guide 4 is led into bottom plate 5c from opening 5d provided perpendicular to the above-mentioned bottom plate 5c.

Sealing tool 6 is provided with radiating ribs 6a on the peripheral surface with respect to inside surface 5b of the conical shape of the above-mentioned wrapping guide 5, and together with being able to heat the surface by housing an internal heater, is retractably provided with wrapping surface 6b in the shape of a cone without a tip. Said sealing tool 6 is able to be rotated by a rotating device such as a motor.

Figure 3:
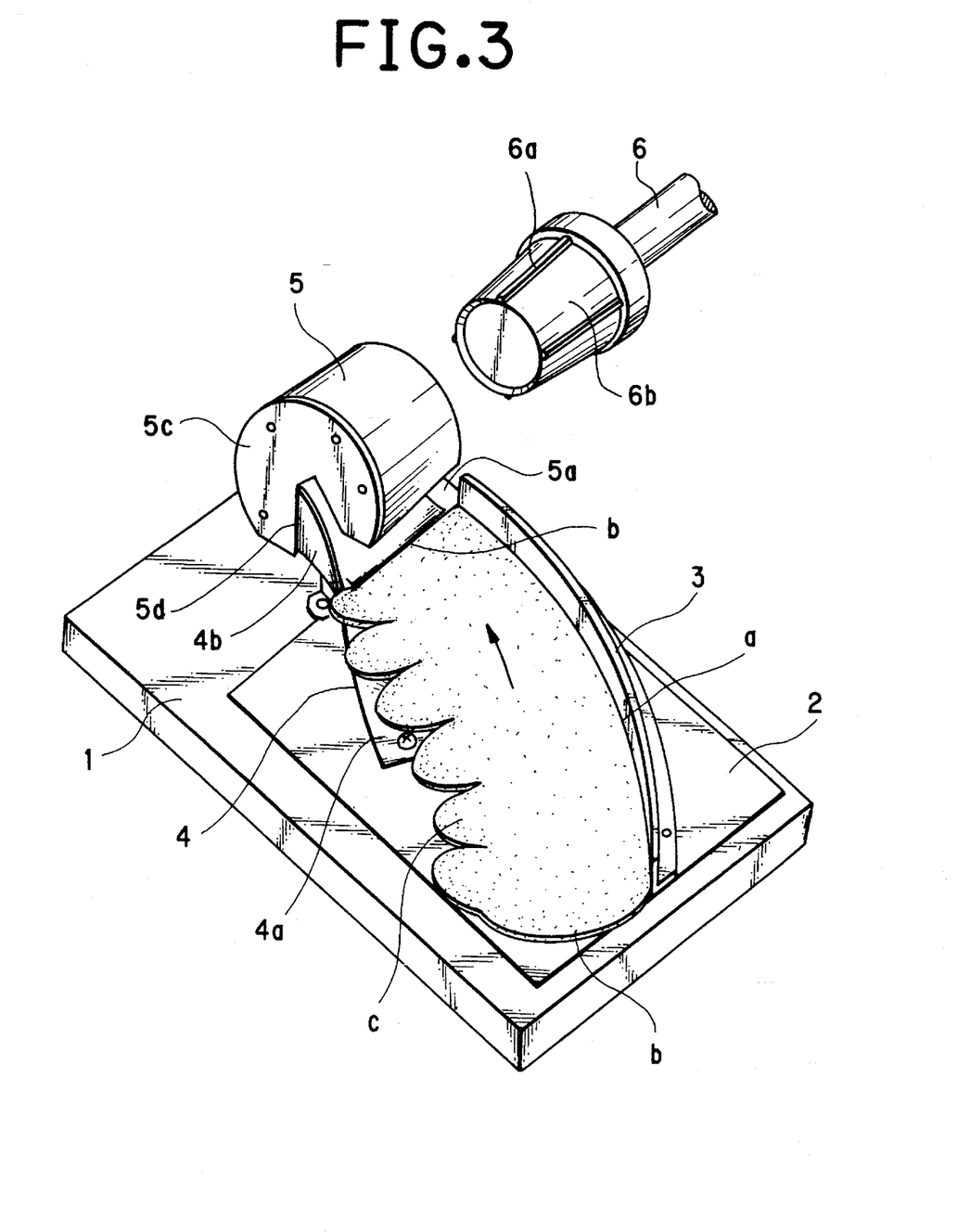
FIG. 3 is a perspective view of the state in which the flat sheet of the dough of an embodiment of the present invention is placed on a production apparatus.
Figure 4:
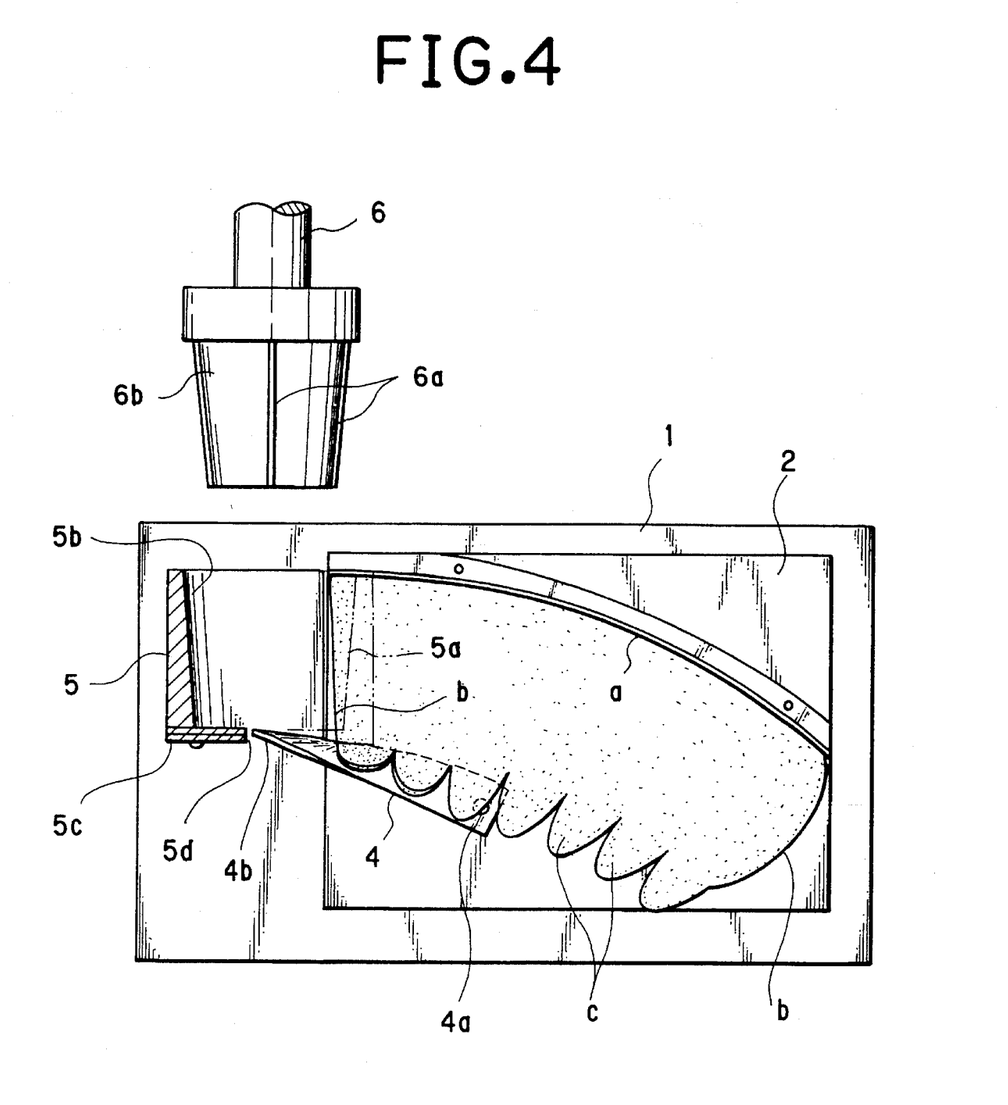
FIG. 4 is an overhead view of the above.

As shown in FIGS. 3 and 4, if a flat sheet of stamped dough is placed on stand 2 of work table 1 while aligning its arc-shaped side a with guide plate 3, the flat sheet of dough is heated and/or warmed by heating stand 2. While thus retaining its flexibility, the base ends of parabolic pieces c coincide with the end on the guide plate 3 side of bending guide 4. Since bending plate 4 then bends said parabolic pieces c towards vertical lead out side 4b from horizontal lead in side 4a, parabolic pieces c of the flat sheet of dough that is heated and/or warmed are sequentially bent up as a result of following the curvature of said bending plate 4.

Figure 1:
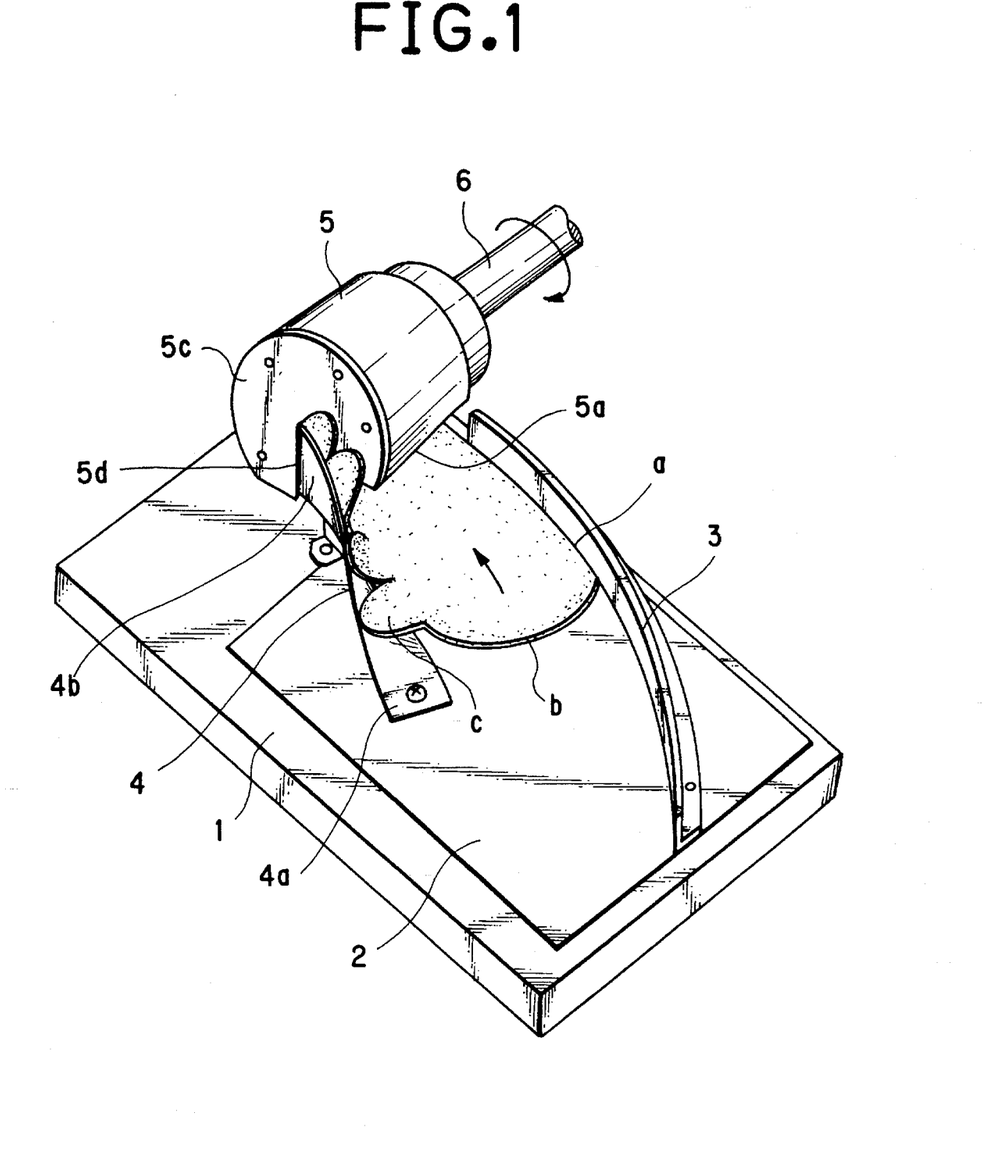
FIG. 1 is a perspective view of the state in which the flat sheet of the dough of an embodiment of the present invention is wrapped with a production apparatus.
Figure 2:
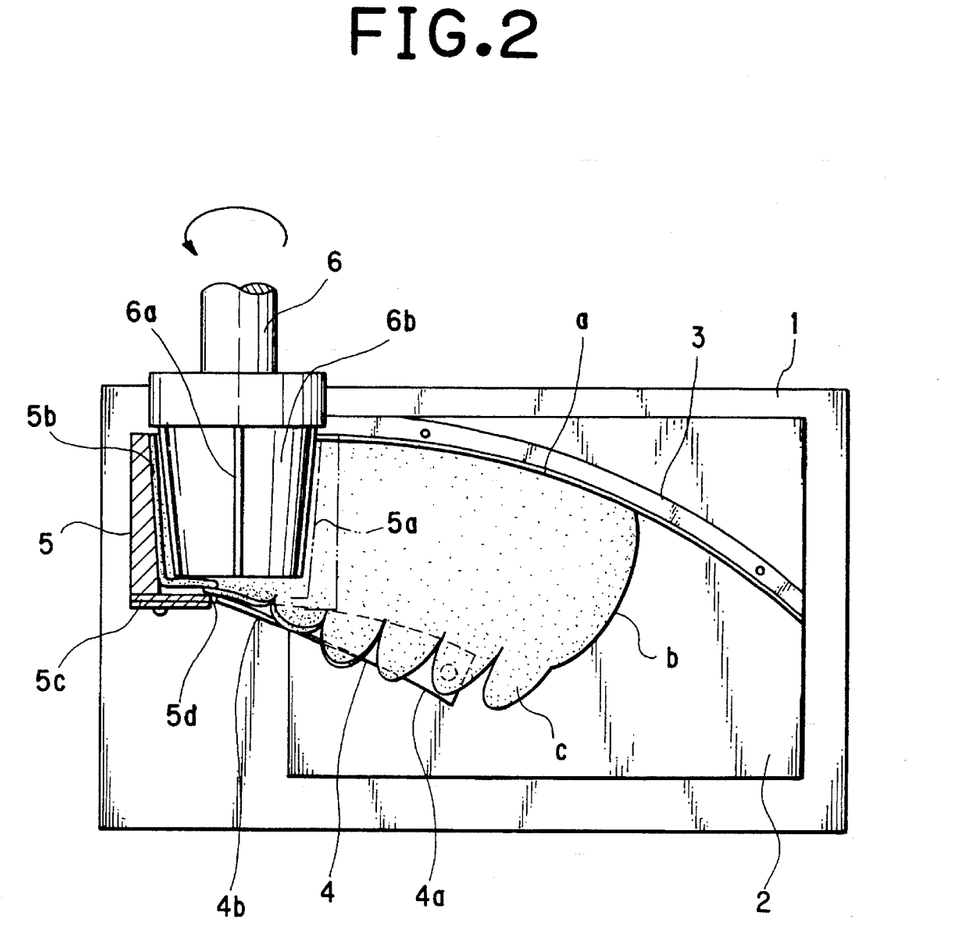
FIG. 2 is an overhead view of the above.

As shown in FIGS. 1 and 2, in the state in which these parabolic pieces c are bent up, the flat sheet of dough is fed into wrapping guide 5 and is wrapped as a result of clinging to ribs 6a on wrapping surface 6b of sealing tool 6. Moreover, the entire surface of the flat sheet of dough is wrapped while being heated and/or warmed by wrapping surface 6b due to the rotation of sealing tool 6, thereby enabling the flat sheet of dough to be wrapped into the shape of a cup.

Although both left and right sides b of the flat sheet overlap at this time, since wrapping surface 6b is rotating to approach inside surface 5b of wrapping guide 6, both the overlapped left and right sides b are pressed together between wrapping surface 6b and inside surface 5b causing them to be adhered. In addition, upright parabolic pieces c are pressed between the end surface of bending surface 6b and bottom plate 5c causing them to be adhered and form the bottom surface of the cup. The flat sheet of dough is then removed from sealing tool 6 to complete the forming process.

Thus, dough that has been formed into the shape of a cup solidifies by natural cooling, thereby enabling it to be used as a container for frozen confections such as soft ice cream and ice cream. In addition, since the a flat bottom surface is formed, it can also be set down.

Since the present invention is able to form an edible container in the shape of a cup with a bottom as described above, it can be placed on a table and so forth when it is sold or while it is being eaten. This eliminates the problems of conventional conical edible containers such as the bother of having to continue to hold said edible container from the time frozen confection is placed inside until it is finished being eaten, or the problem of having to make available a special stand to enable it to be set down.

Since the cut shape of the flat sheet of dough is a shape that can be stamped out easily, and the parabolic pieces that form the bottom surface of the cup shape do not have pointed tips, there is no solidification of pointed ends before solidification of other portions begins, thus preventing premature cracking of the tips in the forming process for the bottom surface of the cup, and enabling the bottom surface of the cup to be formed without generating excessive strain.

In addition, the production apparatus for forming the flat sheet of stamped dough into the shape of a cup is inexpensive since it employs a simple structure. Since it can also be easily installed at each retail store, flat sheets of dough can be transported as is, thus being able to eliminate waste of shipping and storage space as well as problems with breakage.

What is claimed is:

1. An edible container comprising:

a truncated conically shaped in side wall panel made of a pliable edible dough sheet having a pair of opposed side edges which are overlapped with one another, said side wall panel having arcuate upper and lower edges; and a plurality of parabolic pieces integral with said wall panel and positioned in side-by-side relationship about the lower edge, said parabolic pieces being inwardly folded relative to said lower edge thereof such that adjacent ones of said parabolic pieces at least partially overlap and adhere to one another, wherein said at least partially overlapped and adhered adjacent parabolic pieces form a substantially flat bottom wall of the edible container and wherein said parabolic pieces are formed such that said pieces substantially uniformly solidify to prevent cracking of said bottom wall.

2. The edible container of claim 1, wherein said edible dough sheet is comprised of an aqueous mixture of wheat flour, sugar and at least one other ingredient selected from baking oil and fat.

3. The edible container of claim 2, wherein said dough sheet is comprised of 100 parts wheat flour, 40 parts sugar, 10 parts of at least one other ingredient selected from baking oil and fat, 0.2 parts salt and 100 parts water.

4. The edible container of claim 3, wherein said dough sheet is further comprised of minor amounts of egg, milk and a colorant.

5. A process for making an edible container, comprising the steps of:

(i) forming a pliable flat sheet of edible dough having a side wall panel formed by opposed side edges, an arcuate upper edge and an arcuate lower region each of which extends between the opposed side edges, and a plurality of tongue pieces extending outwardly from an arcuate bottom region of the flat sheet such that the tongue pieces are positioned in a side-by-side manner along the arcuate lower region between the opposed side edges;

(ii) wrapping the flat sheet around a forming mandrel so that said side wall panel is formed into a generally conical shape; and (iii) simultaneously with said wrapping of the flat sheet according to step (ii), sequentially folding the tongue pieces inwardly relative to said lower region of the side wall panel such that adjacent ones of said tongue pieces at least partially overlap and adhere to one another so as to form a substantially flat bottom wall of the edible container, and wherein said process further comprises, (iv) preventing cracking of said bottom wall during practice of step (iii) by forming each of said tongue pieces during step (i) into a parabolic shape such that said parabolic-shaped tongue pieces substantially uniformly solidify and thereby prevent bottom wall cracking.

6. The process of claim 5, wherein step (ii) includes bringing the flat sheet into contact with ribs which extend from the forming mandrel such that the flat sheet clings to the ribs and is wrapped around the forming mandrel.

7. The process of claim 5, wherein step (iii) includes pressing the overlapped adjacent parabolic pieces between a terminal end of the forming mandrel and a plate so as to cause the overlapped adjacent parabolic pieces to adhere to one another.

8. The process of claim 5, which comprises heating the flat sheet of edible dough prior to or during step (ii).

9. The process of claim 5, wherein prior to step (i) there is practiced the step of forming the edible dough by mixing and kneading raw dough ingredients.

10. The process of claim 9, wherein the raw dough ingredients include wheat flour, sugar and at least one of fat or oil.

11. The process of claim 9, which includes spreading the mixed and kneaded raw dough ingredients onto a heating plate, and heating the dough sufficient to alphatize the flour starch therein, and then drying the heated dough.

12. The process of claim 5, wherein prior to step (ii) there is practiced moisturizing the dough sheet.

* * * * *